(12) United States Patent
Akamatsu

(10) Patent No.: US 12,076,889 B2
(45) Date of Patent: Sep. 3, 2024

(54) ADHESION FORCE CONFIRMATION METHOD AND ADHESION FORCE CONFIRMATION DEVICE

(71) Applicant: KOSMEK LTD., Kobe (JP)

(72) Inventor: Hiroshi Akamatsu, Kobe (JP)

(73) Assignee: KOSMEK LTD. (JP)

(*) Notice: Subject to any disclaimer, the term of this patent is extended or adjusted under 35 U.S.C. 154(b) by 384 days.

(21) Appl. No.: 17/614,042

(22) PCT Filed: Apr. 13, 2020

(86) PCT No.: PCT/JP2020/016241
§ 371 (c)(1),
(2) Date: Nov. 24, 2021

(87) PCT Pub. No.: WO2020/241090
PCT Pub. Date: Dec. 3, 2020

(65) Prior Publication Data
US 2022/0227025 A1 Jul. 21, 2022

(30) Foreign Application Priority Data
May 31, 2019 (JP) .................................. 2019-102544

(51) Int. Cl.
*B29C 33/32* (2006.01)
*B22D 17/22* (2006.01)
(Continued)

(52) U.S. Cl.
CPC .............. *B29C 33/32* (2013.01); *B22D 17/22* (2013.01); *B22D 17/26* (2013.01); *B22D 17/32* (2013.01);
(Continued)

(58) Field of Classification Search
CPC ........ B22D 17/26; B22D 17/22; B22D 17/32; B22D 33/00; B29C 45/1742; B29C 45/76;
(Continued)

(56) References Cited

U.S. PATENT DOCUMENTS 3,394,588 A * 7/1968 Mohle ..................... G01N 19/04
73/150 A
3,788,135 A * 1/1974 Hammond, Jr. ....... G01N 19/04
374/15
(Continued)

FOREIGN PATENT DOCUMENTS

JP 2005-515080 5/2005
JP 2006-224261 8/2006
(Continued)

OTHER PUBLICATIONS

International Search Report dated Jun. 23, 2020 issued in International Application No. PCT/JP2020/016241, 2 pages.

*Primary Examiner* — Helen C Kwok
(74) *Attorney, Agent, or Firm* — Merek, Blackmon & Voorhees, LLC

(57) ABSTRACT

The present invention enables confirmation that a mold magnetically adhered by a magnetic clamping device has been magnetically adhered by a sufficient adhesion force so as not to be pulled off from the magnetic clamping device by a mold opening force of a mold handling device. A controller 7 carries out magnetization of a magnetic clamping device 10 such that a magnetic adhesion force weaker than that in normal magnetization is generated in a state where molds M1, M2 are bound together, and carries out a test to determine whether separation of the molds M1, M2 would occur when platens 2, 3 are separated. The controller issues a warning regarding lack of guaranteed adhesion force to an
(Continued)

operator when separation is detected, and carries out normal magnetization of the magnetic clamping device 10 when separation is not detected.

5 Claims, 4 Drawing Sheets

(51) Int. Cl.
*B22D 17/26* (2006.01)
*B22D 17/32* (2006.01)
*B22D 33/00* (2006.01)
*B29C 45/76* (2006.01)
*B29C 45/84* (2006.01)
*G01N 19/04* (2006.01)
*H01F 7/08* (2006.01)
*H01F 7/16* (2006.01)

(52) U.S. Cl.
CPC .............. *B22D 33/00* (2013.01); *B29C 45/76* (2013.01); *B29C 45/84* (2013.01); *G01N 19/04* (2013.01); *H01F 7/081* (2013.01); *H01F 7/16* (2013.01)

(58) Field of Classification Search
CPC . B29C 45/84; B29C 2045/1746; B29C 33/32; B29C 2945/76157; B29C 2945/76227; B29C 2945/76488; B29C 2945/76505; G01N 19/04; H01F 7/16; H01F 7/081
See application file for complete search history.

(56) References Cited

U.S. PATENT DOCUMENTS

| | | | | |
|---|---|---|---|---|
| 4,934,185 | A | * | 6/1990 | Nishiyama ............... G01N 3/24 73/827 |
| 5,333,494 | A | * | 8/1994 | Kishima ................ G01N 19/04 73/104 |
| 6,636,153 | B1 | | 10/2003 | Barton et al. |
| 2011/0265561 | A1 | * | 11/2011 | Toizumi ................. G01N 3/567 73/150 A |
| 2016/0139031 | A1 | * | 5/2016 | Landrum ............... G01N 19/04 73/150 A |

FOREIGN PATENT DOCUMENTS

| | | |
|---|---|---|
| JP | 5385544 | 10/2009 |
| JP | 5683826 | 10/2011 |
| WO | WO2008/105033 | 9/2008 |

\* cited by examiner

ADHESION FORCE CONFIRMATION METHOD AND ADHESION FORCE CONFIRMATION DEVICE

FIELD OF THE INVENTION

The present invention relates to an adhesion force confirmation method and an adhesion force confirmation device capable of confirming that a mold is magnetically adhered to a magnetic clamping device with a sufficient adhesion force.

In a mold handling equipment such as an injection molding machine, a magnetic clamping device using a magnetic adhesion force is known as a device for fixing a mold. The magnetic clamping device is a technique for magnetically fixing a mold by attaching a magnetic plate to a platen. The plate has magnets with non-reversible polarity and magnets with reversible polarity (alnico magnet) to switch between a magnetic circuit that closes inside a plate and a magnetic circuit that passes through a mold by controlling the magnetic polarity of the alnico magnet with a coil.

The mold is magnetically adhered to the magnetic clamping device while maintaining its precise position. The mold is a heavy object, and if the mold is detached from the magnetic clamping device, it may lead to a serious accident. Therefore, the magnetic clamping device is provided with a means for detecting that the mold is displaced or floated.

For example, according to Patent Document 1, a plurality of magnetic adhesion units for fixing molds and detection means for detecting an operating state of the magnetic clamping device are provided. An exploring coil of this detection means is mounted outside a main coil of the magnetic adhesion unit. According to this, when the mold moves slightly with respect to the magnetic clamping device, a voltage is induced in the exploring coil to detect an abnormality in the magnetization state.

The induced voltage is function of product of the number of windings and a change rate of a magnetic flux, and a small change in the magnetic flux in a short time interval produces a large voltage. According to Patent Document 2, a technique is known in which a coil for switching the polarity of an alnico magnet is effectively used as a detection coil for detecting misaligning or floating of a mold. By increasing the number of coil windings, weak magnetic flux changes are detected to generate a higher induced electromotive force compared to noise.

Further, Patent Document 3 discloses what determines an abnormality when the voltage waveform induced in the coil continues for a predetermined time from the first threshold value, or when a voltage exceeding a second threshold value over the first threshold value is generated even for a short period of time.

PRIOR ART

Patent Documents

Patent Document 1: Japanese Patent Laid Open Publication No. 2005-515080
Patent Document 2: Japanese Patent No. 5385544
Patent Document 3: Japanese Patent No. 5683826

DISCLOSURE OF THE INVENTION

Problems to be Solved by the Invention

In patent documents 1, 2 and 3, when the induced voltage generated in the coil is measured and exceeds a threshold value set in a comparison circuit, an emergency situation is generated as the mold is misaligned or floated. In these technologies, the mold can be detected only when misalignment or float from the magnetic clamping device occurs, and it is not possible to confirm whether the mold is magnetically adhered with enough or just barely enough adhesion force.

On the other hand, there are various molds owned by users of mold handling device, such as area of contact surface with magnetic clamping device side, mold size, mold weight, and type of mold material. In addition, the magnetic adhesion force varies depending on a change in surface roughness caused by scratches or rust on the contact surface of the mold, and by adhesion of dust. Therefore, on the magnetic clamping device side, it is not possible to confirm whether the magnetically adhered mold is in a magnetic adhesion state with a margin or not.

The object of the present invention is to provide an adhesion force confirmation method and an adhesion force confirmation device, which can confirm that the mold magnetically adhered to the magnetic clamping device is magnetically adhered with sufficient adhesion force not to be pulled off the magnetic clamping device by a mold opening force of the mold handling device.

Means to Solve the Problem

The adhesion force confirmation method of the present invention, in an adhesion force confirmation method of a mold handling device including a magnetic clamping device that has a magnetizing coil, a reversible magnet whose magnetic poles are reversed according to a direction of an electric current flowing in the magnetizing coil, and a non-reversible magnet on opposite plates proximate to or separated from each other, and the mold is adhered and fixed to the plates by the magnetic force of the reversible magnet and the magnetic force of the non-reversible magnet, is characterized in that the electric current of the magnetizing coil is applied so that the magnetic clamping device exerts a weaker magnetic adhesion force than normal magnetization, and the mold handling device is operated, and then opposing platens are separated to test if the mold detaches from the plates, and if peeling is detected, a warning that the adhesion force cannot be guaranteed is issued to an operator, and if peeling is not detected, the electric current of the magnetizing coil is applied so that the magnetic clamping device exerts the magnetic adhesion force by the normal magnetization.

In addition, an adhesion force confirmation device of the present invention, in an adhesion force confirmation device of a mold handling device including a magnetic clamping device that has a magnetizing coil, a reversible magnet whose magnetic poles are reversed according to a direction of an electric current flowing in the magnetizing coil, and a non-reversible magnet on each of opposite plates proximate to or separated from each other, and the mold is adhered and fixed to the plates by the magnetic force of the reversible magnet and the magnetic force of the non-reversible magnet, is characterized in having an ignition circuit for controlling an amount of electric current of the magnetizing coil and a controller for controlling the magnetic clamping device or the mold handling device, and in that the controller controls the electric current of the magnetizing coil with the ignition circuit so that the magnetic clamping device exerts a magnetic adhesion force weaker than normal magnetization, and the mold handling device is operated, and then the opposing platens are separated to test if the mold detaches from the plates, and if peeling is detected, a warning is issued to the operator that the adhesion force cannot be guaranteed, and if peeling is not detected, the electric current of the magnetizing coil is controlled with the ignition circuit so that the magnetic clamping device exerts the magnetic adhesion force due to the normal magnetization.

Effects of Invention

According to the present invention, it is possible to guarantee adhesion in a state with a margin by once performing a test for whether or not peeling is performed by performing test magnetizing, and by then magnetizing with a normal magnetizing current Q1 with an electric current larger than the test magnetizing current Q2.

The invention also has the effect of guaranteeing that the mold has sufficient adhesion force even when the magnetic adhesion force decreases due to a change in surface roughness caused by scratches or rust on the contact surface of the mold, and by adhesion of dust.

BRIEF DESCRIPTION OF THE DRAWINGS

FIG. 1A is an overall view, and FIGS. 1B to 1E show configuration and action of the magnetic clamping device.

FIG. 2A is a circuit diagram of the magnetic clamping device, FIG. 2B is a circuit diagram of a power supply, and FIG. 2C is a waveform diagram.

FIG. 3A is a processing flow corresponding to each mold, and FIG. 3B is a processing flow of a case where the first corresponding mold is continuously used.

PREFERRED EMBODIMENT OF THE INVENTION

Hereinafter, the adhesion force confirmation device according to this example of the present invention will be described. An example of an injection molding machine 1 is shown as a mold handling device. The adhesion force confirmation device is in a form of a processing program utilizing hardware assets of the injection molding machine 1 or magnetic clamping devices 10, 20 and executed on a controller 7 of the injection molding machine 1 or the magnetic clamping devices 10, 20.

Figure 1A:
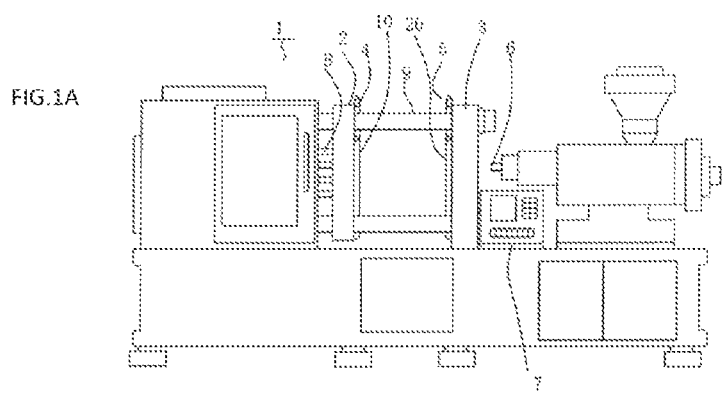
FIGS. 1A to 1E show an injection molding machine and a magnetic clamping device.

In FIG. 1A, the injection molding machine 1 is provided with left and right facing platens 2, 3 on which molds M1, M2 (see FIG. 4) are mounted respectively, and a guide rod 9 for guiding and supporting the left side platen 2 to move forward and backward freely in a left-right direction. On the platens 2, 3, the magnetic clamping devices 10, 20 for magnetically adhering the mold are mounted, respectively. Numeral 6 is a nozzle for injecting resin, numeral 7 is a controller with an input section and LCD display screen, and numeral 8 is an ejector rod for pushing the injection molded material out of the mold M1. Numerals 4, 5 are mold auxiliary fittings, respectively. The controller 7 controls operation of the injection molding machine 1 and the magnetic clamping devices 10, 20. Since manufacturers that make the injection molding machine 1 and the magnetic clamping devices 10, 20 are usually different, the controllers 7 for the injection molding machine 1 and the magnetic clamping devices 10, 20 are often different, but in this example, they are shown as one unit to simplify the explanation.

Figure 1B:
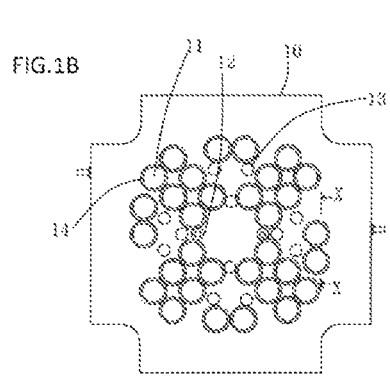

FIG. 1B is a front view of the magnetic clamping device 10. A plurality of magnet blocks 11 are arranged on a front side of the magnetic clamping device 10. In addition, a proximity sensor 12 and a magnetic flux coil (not shown) for detecting changes in magnetic flux are arranged. The ejector rod 8 is inserted into a through hole 13. The magnetic clamping device 20 is almost the same as the magnetic clamping device 10 and the description thereof will be omitted, but the magnetic clamping device 20 is different in that the through hole 13 provided in the magnetic clamping device 10 does not exist.

The main body of the magnetic clamping device 10 is a plate (steel) PL made of magnetic material, and a large number of circular groove portions 14 are provided on the front side (the drawing, left side). A portion surrounded by each groove portion 14 corresponds to a magnet block 11.

Figure 1C:
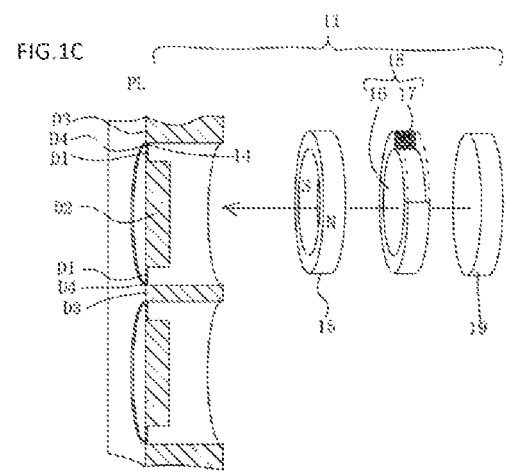

FIG. 1C is an exploded sectional view taken along X-X line in FIG. 1B. In the figure, the plate PL is integrally provided with a portion D1 having a reduced steel thickness on an inner peripheral side of the groove portion 14 and a disk-shaped inner pole D2 having a thicker steel inside the portion D1. A ring-shaped non-reversible magnet 15 is fitted into the portion D1 from a back side of the plate PL. The non-reversible magnet 15 has magnetic poles on the inner peripheral side and outer peripheral side of the ring, which is its outer shape. For example, the inner peripheral side has an S pole and the outer peripheral side has an N pole. As the non-reversible magnet 15, for example, a neodymium magnet can be used. Behind the non-reversible magnet 15, a reversible magnet 18 composed of a disc-shaped alnico magnet 16 and a magnetizing coil 17 wound around the outside of the alnico magnet 16 are arranged. A disc-shaped joint iron 19 is fitted behind the reversible magnet 18. The inner peripheral side of the non-reversible magnet 15 is magnetically coupled to the inner pole D2, and is magnetically coupled to the outer peripheral side (outer pole D3) of the portion D1 where the thickness on the outer peripheral side is thinned. Further, the alnico magnet 16 is magnetically coupled to the inner pole D2 and the joint iron 19, and the joint iron 19 is magnetically coupled to the outer pole D3. Further, the portion D4 of the groove portion 14 is further thinned as compared with the other portions, so that it is easily magnetically saturated. Since the front side of the plate PL is entirely covered with the steel of the plate PL, the non-reversible magnet 15 and the reversible magnet 18 can be sealed from a work area where the mold M1 is mounted.

Figure 1D:
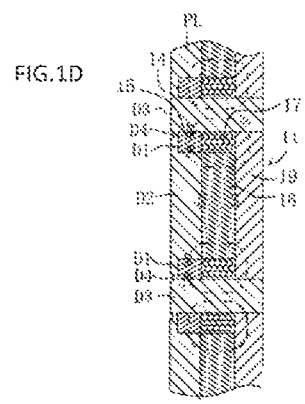

FIG. 1D shows a state when the magnetic clamping device 10 is in a demagnetized state. The alnico magnet 16 is a permanent magnet having an N pole on the front side of the plate PL (in the drawing, left side) and an S pole on the back side. As a result, the magnetic flux passes through the magnetic circuit composed of the non-reversible magnet 15, the outer pole D3, the joint iron 19, the alnico magnet 16, and the inner pole D2. In this state, the magnetic flux does not leak to the front side of the plate PL, and the mold M1 is not adhered.

Figure 1E:
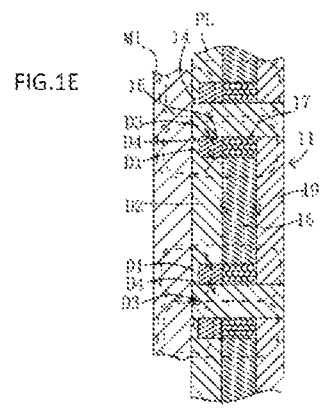

FIG. 1E shows a state when the magnetic clamping device 10 is in a magnetized state. By passing DC current through the magnetizing coil 17 from the outside, the magnetic poles of the alnico magnet 16 are inverted. The alnico magnet 16 is a permanent magnet having an S pole on the front side of the plate PL and an N pole on the back side. The polarity of the alnico magnet 16 is reversed, and the DC current may be passed for the time to magnetize the required magnetic flux. On the front side of the plate PL, both the non-reversible magnet 15 and the reversible magnet 18 are coupled to the inner pole D2 as S poles. When the mold M1 is pressed against the front side of the plate PL, these magnetic fluxes pass through the mold M1. As a result, a magnetic circuit composed of the non-reversible magnet 15, the outer pole D3, the mold M1 and the inner pole D2, and a magnetic circuit composed of the alnico magnet 16, the outer pole D3, the mold M1 and the inner pole D2, are formed. Since the alnico magnet 16 does not have a relatively high coercive force as a permanent magnet, when the mold M1 is lost, the magnetic force from the front side of the plate PL toward the outside is immediately lost by the magnetic force of the non-reversible magnet 15.

Figure 2A:
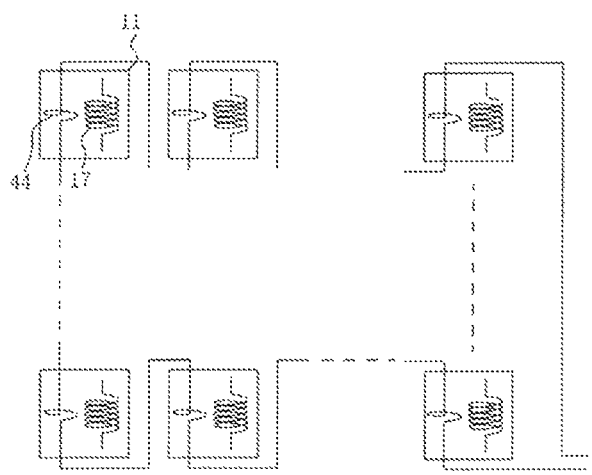
FIGS. 2A to 2C show circuit and operation of a magnetic clamping device.

FIG. 2A shows an electric circuit of the magnet blocks 11 of the magnetic clamping device 10. Each magnet block 11 is provided with a magnetizing coil 17 for inverting the magnetic polarity of an alnico magnet (not shown) and a sensor coil 44 for measuring the adhesion force. The sensor coil 44 is a coil that detects changes in magnetic flux passing through the alnico magnet. The sensor coil 44 is wound around, for example, the alnico magnet. The sensor coils 44 of the magnet blocks 11 are connected in series, and detect changes in magnetic flux with respect to the entire magnetic clamping device 10.

Figure 2B:
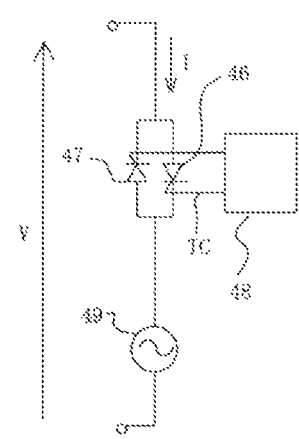
Figure 2C:
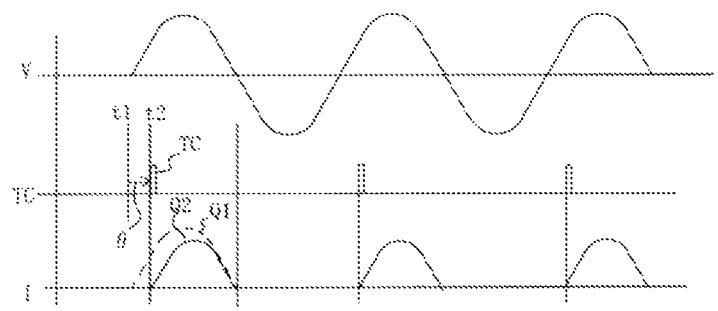

FIG. 2B shows a power supply for driving the magnetizing coil 17 of all of the magnet blocks 11 of the magnetic clamping device 10. The power supply is rectified by thyristor 46, 47 with respect to an external AC power supply 49. The thyristor 46 is turned on when magnetizing, and the thyristor 47 is turned on when demagnetizing. Each of the thyristor 46, 47 is controlled by an ignition circuit 48 for an ignition angle θ. The ignition circuit 48 can change the ignition angle θ of the thyristor 46 according to the instruction of the controller 7. The ignition circuit 48 can generate a trigger pulse TC for the thyristor 46 in a phase t1 at a rising time of the AC power supply 49 or in a phase t2 shifted by the ignition angle θ (see FIG. 2C). Hereinafter, the electric current flowing through the magnetizing coil 17 when the trigger pulse TC is generated at the time of the phase t1 is referred to as "normal magnetizing current" Q1. Further, the electric current flowing when the trigger pulse TC is generated at the time of the phase t2 is referred to as "test magnetizing current" Q2. When these electric currents flow through the magnetizing coil 17, the magnetic clamping device 10 is in a magnetized state (as the polarity of the alnico magnet is determined). Here, an adhesion force exerted by the magnetic clamping device 10 when the "normal magnetizing current" Q1 flows through the magnetizing coil 17 is defined as an adhesion force MF1 (which can be measured by the sensor coil 44), and an adhesion force exerted by the magnetic clamping device 10 when the "test magnetizing current" Q2 flows is defined as an adhesion force MF2. Further, mold opening force F is the force of an injection molding machine that opens the molds M1, M2 shown in FIG. 4, and the adhesion force MF2 is set to be equal to or larger than a value obtained by multiplying the mold opening force F by a safety factor SF. In this example, the safety factor SF was set to 110%, and the adhesion force ratio MF2/MF1 was set to 80% in order to secure this. In the figure, reference code V is a power supply voltage and reference code I is an electric current.

Figure 3A:
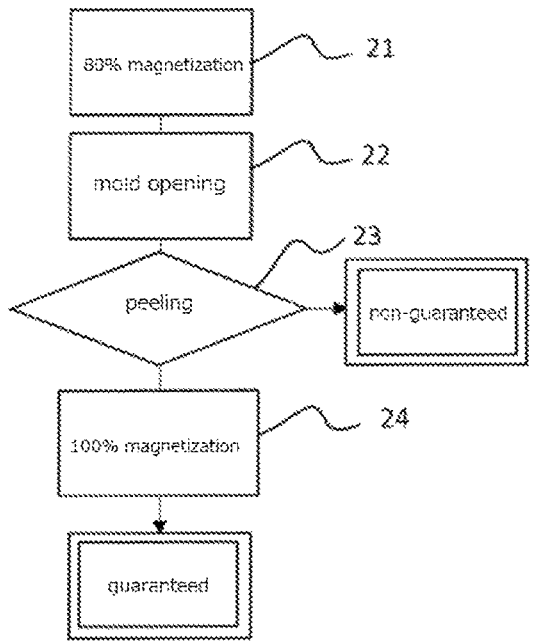
FIGS. 3A to 3B show a processing flow of an adhesion force confirmation device.

FIG. 3 shows an adhesion force confirmation device mounted as a processing flow of the controller 7. The adhesion force confirmation device of FIG. 3A is mounted on the controller 7 as a program corresponding to each mold.

The processing flow of FIG. 3A of this program will be described with reference to FIG. 4.

Figure 4A:
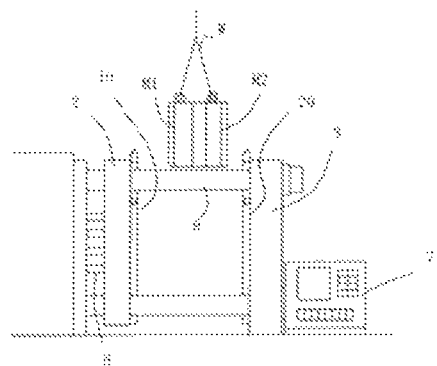
FIGS. 4A to 4C are explanatory diagrams showing a state where an injection molding machine, a magnetic clamping device, and a mold are installed, respectively.
Figure 4B:
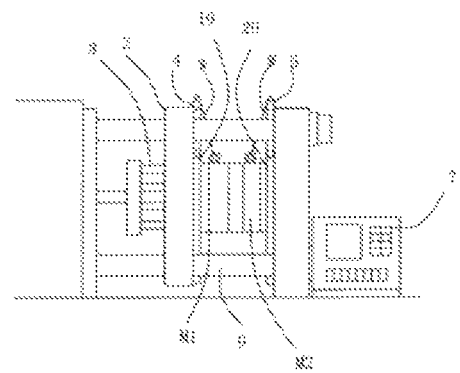
Figure 4C:
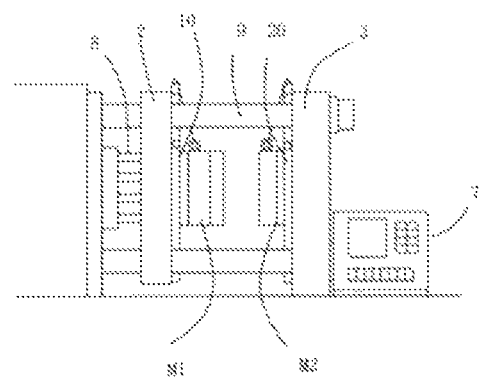

The left and right molds M1, M2 are suspended and transported between the magnetic clamping devices 10, 20 in a state of being fitted to each other (FIG. 4A). At this time, the magnetic clamping devices 10, 20 are in a state in which the molds M1, M2 are demagnetized (a magnetized release state in which magnetic adhesion is not performed). Next, the left platen 2 is moved to the right to sandwich the molds M1, M2 between the magnetic clamping devices 10, 20. In this state, the magnetic clamping devices 10, 20 switch the molds M1, M2 from the demagnetized state to the magnetized state (FIG. 4B). At this time, the ignition circuit 48 is controlled so that the magnetic clamping device 10 is in a state of weak adhesion force MF2 (80% magnetization) (step 21, FIG. 3A). At this time, the magnetizing of the magnetic clamping device 10 by passing the "test magnetizing current" Q2 is referred to as "test magnetizing". Wires W that suspend the molds M1, M2 are attached to the mold auxiliary metal fittings 4, 5 provided on the platens 2, 3, respectively. The mold auxiliary metal fittings 4, 5 are used to prevent the molds M1, M2 from falling to the floor. In the test magnetizing, the mold handling device is operated under the same conditions as the normal magnetizing state except for the adhesion force. That is, in the case of the injection molding machine 1, resin is ejected from the nozzle 6 into the molds M1, M2 to manufacture a molding material (molded product). This is the same condition as the normal magnetizing state, because even when the same mold is used, depending on the conditions such as the material and temperature of the base material molded by the mold and a surface area of the molded product, the degree of adhesive strength (or viscosity) between the molding material and the mold differs, and a force necessary and sufficient to open the molds M1, M2 (referred to as "mold opening force F") also changes. When the mold handling device is a press machine, the test magnetizing is performed in a state where the product is actually pressed. Further, even when the mold handling device is a die casting device, the test magnetizing is performed in a state where the product is actually cast.

In this state, the injection molding machine 1 separates the platens 2, 3 (step 22 in FIG. 3A). The injection molding machine 1 separates the platens 2, 3 with a force much larger than the mold opening force F, the adhesion force MF1 and the adhesion force MF2, and pushes out the molded product with the ejector rod 8. At this time, if the molds M1, M2 are misaligned or float, a change in the magnetic flux flowing through the molds M1, M2 causes an electric current to flow in the sensor coil 44, thereby detecting peeling of the molds M1, M2 (step 23). The peeling of the molds M1, M2 can be detected by the proximity sensor 12. If no peeling is detected, it can be confirmed that the adhesion force MF2 exceeds the mold opening force F. The controller 7 controls the ignition circuit 48 so that the magnetic clamping device 10 exerts the adhesion force MF1 (100% magnetizing) stronger than the adhesion force MF2 by flowing the "normal magnetizing current" Q1 (step 24). The magnetizing of the magnetic clamping device 10 at this time is referred to as "normal magnetizing". After that, the injection work is performed in a state where it is guaranteed that the molds M1, M2 are clamped by the adhesion force, which is sufficiently larger than the mold opening force F (the adhesion force MF1 is 110% or more with respect to the mold opening force F), thereby enabling mass-production of molded products.

On the other hand, when peeling is detected in step 23, even if the adhesion force is increased from the adhesion force MF2 to the adhesion force MF1, it is not possible to guarantee adhesion with a margin of only 10% over the mold opening force F. The liquid crystal display screen of the controller 7 notifies the operator of a warning that the adhesion cannot be guaranteed.

According to a processing flow of the adhesion force confirmation device shown in FIG. 3A of this example, once test magnetization is performed to test whether or not peeling will occur, and then normal magnetization with a current higher than the test magnetization current Q2 is performed, thereby enabling to guarantee the adhesion force MF1 to adsorb with a margin of 10% or more of the mold opening force F.

Figure 3B:
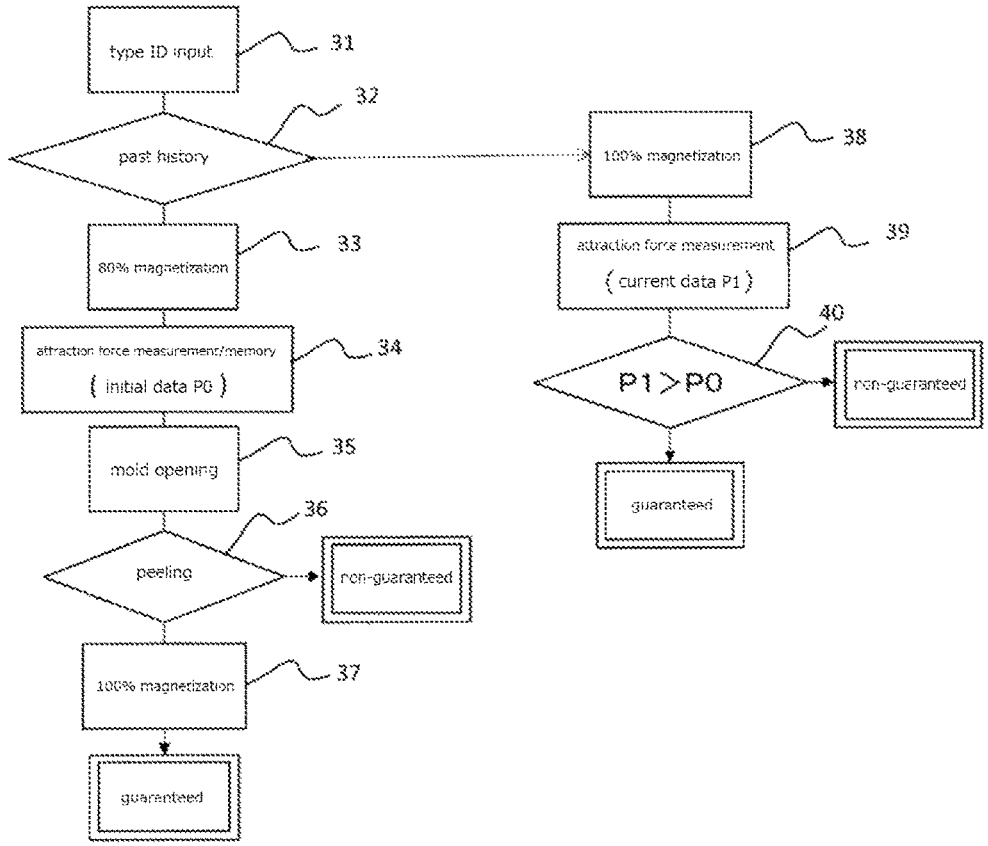

Adding some steps to the processing flow of the adhesion force confirmation device of FIG. 3A, FIG. 3B shows an adhesion force confirmation device mounted on the controller 7 as a program for a case where the mold once attached to the injection molding machine 1 is once removed and then attached to the injection molding machine 1 again to be used. FIG. 3B is a processing flow of this program. Type ID for identifying the molds M1, M2 is input (Step 31). The input of the type ID can be performed by affixing a barcode to the molds M1, M2 and reading it with a barcode reader (not shown), or it can be typed directly by the operator from the input section of the controller 7. Next, it is judged whether or not the type ID has been handled in the past (Step 32). If it has not been handled before, test magnetization is performed by the test magnetizing current Q2 to bring the magnetic clamping device 10 into a magnetized state of 80% (Step 33). Then, in this state, the platens 2, 3 are separated to perform mold opening (Step 35). At that time, the sensor coil 44 measures the adhesion force by 80% magnetization. The measured adhesion force is stored as initial data P0 in association with the type ID (Step 34).

Similar to FIG. 3A, it is determined whether or not the molds M1, M2 are peeled off (Step 36). If peeling cannot be detected, the magnetic clamp once releases the state in which the molds M1, M2 are adhered, and then the normal magnetizing current Q1 is passed to change the magnetized state of the magnetic clamping device 10 to the normal magnetized state, i.e., the adhesion force MF1 (100% magnetization) (Step 37).

On the other hand, in Step 32, if the mold of the relevant type ID has been handled in the past, the mold is magnetized with the adhesion force MF1 (100% magnetization) by passing the "normal magnetizing current" Q1 in the state where the molds M1, M2 of FIG. 4B are put together (Step 38). Then, the current data P1 is gotten by measuring the adhesion force by the sensor coil 44.

The already stored initial data P0 is compared with the current data P1 (Step 40). As a result of comparison, if the current data P1 is lower than the initial data P0, adhesion with a margin excessing 110% cannot be guaranteed. On the other hand, if the current data P1 is the same or higher than the initial data P0, the adhesion in a state with a margin can be guaranteed, so that the following normal injection molding work is allowed to be performed. These results are displayed on the liquid crystal display screen of the controller 7 to notify the operator. The operator can continue the work after confirming the adhesion in a state with a margin.

According to the processing flow of the adhesion force confirmation device shown in FIG. 3B according to this example, it can be confirmed whether or not it can be guaranteed to have sufficient magnetic adhesion force even when the magnetic adhesion force decreases even after 100% magnetization due to changes in surface roughness caused by scratches or rust generated on the contact surface of the mold, or adhesion of dust.

In the above example, the magnetizing current was controlled in order to control the magnetizing state of the magnetic clamping device 10. That is, although the magnitudes of the magnetizing currents Q1, Q2 were controlled so that the test magnetizing current Q2 was set to a value smaller than the normal magnetizing current Q1 and the adhesion force MF2 was 1.1 times or more the adhesion force MF1, other methods can be used. For example, it can be controlled by changing the voltage of the AC power supply 49.

In the above example, although the sensor coil 44 was provided separately from the magnetizing coil 17, as shown in Patent Document 2, a magnetic pole reversing coil (corresponding to the magnetizing coil 17) can be switched and used as a sensor coil. When the magnetic pole reversing coil is used as a sensor coil, a circuit for switching is required, but it has an advantage of improved sensitivity due to the large number of turns.

In the above example, although the measurement of the adhesion force of the magnetic clamping device 10 during magnetization and the measurement of changes in magnetic flux during so-called peeling when the mold shifts or floats were both performed with one of the sensor coils 44, each event can be measured using separate sensor coils.

DESCRIPTION OF SYMBOLS 1 injection molding machine
2, 3 platen
4, 5 mold auxiliary metal fitting
6 nozzle
7 controller
8 ejector rod
9 guide rod
10, 20 magnetic clamping device
11 magnet block
12 proximity sensor
13 through hole
14 groove portion
15 non-reversible magnet
16 alnico magnet
17 magnetizing coil
18 reversible magnet
19 joint iron
44 sensor coil
46, 47 thyristor
48 ignition circuit
49 AC power supply
PL plate

The invention claimed is:

1. An adhesion force confirmation method for a mold handling device provided with a magnetic clamping device having a magnetizing coil, a reversible magnet whose magnetic poles are reversed according to a direction of electric current flowing in the magnetizing coil, and a non-reversible magnet on each of opposing plates proximate to or separated from each other, in which a mold is adhered and fixed to the opposing plates by a magnetic force of the reversible magnet and a magnetic force of the non-reversible magnet, comprising:
operating the mold handling device by applying an electric current of the magnetizing coil so that the magnetic clamping device exerts a magnetic adhesion force weaker than a normal magnetization, next separating the opposing plates, then conducting a test whether the mold peels from the opposing plates; and when detecting peeling, issuing a warning to an operator that the adhesion force cannot be guaranteed, and otherwise, applying the electric current of the magnetizing coil so that the magnetic clamping device exerts the magnetic adhesion force by the normal magnetization.

2. The adhesion force confirmation method of claim 1, the magnetic adhesion force weaker than the normal magnetization is achieved by controlling the electric current of the magnetizing coil to the electric current weaker than the normal magnetization.

3. The adhesion force confirmation method according to claim 1, comprising:
   determining whether the mold is a mold for which the test has already been conducted;
   as a result of the above determination, in a case of the mold that has not been subjected to the test, conducting the test and measuring and storing a magnetic adhesion force during the test,
   as a result of the above determination, in a case of the mold is a mold for which the test has already been conducted, conducting the normal magnetization, measuring a magnetic adhesion force at that time and comparing with the magnetic adhesion force during the test, then in a case that the measured magnetic adhesion force is less than the magnetic adhesion force during the test, issuing a warning to the operator that the adhesion force cannot be guaranteed.

4. An adhesion force confirmation device for a mold handling device provided with a magnetic clamping device having a magnetizing coil, a reversible magnet whose magnetic poles are reversed according to a direction of electric current flowing in the magnetizing coil, and a non-reversible magnet on each of opposing plates proximate to or separated from each other, in which a mold is adhered and fixed to the opposing plates by a magnetic force of the reversible magnet and a magnetic force of the non-reversible magnet, comprising:

an ignition circuit for controlling an amount of electric current of the magnetizing coil; and a controller for controlling the magnetic clamping device or the mold handling device, and wherein the controller controls the electric current of the magnetizing coil with the ignition circuit so that the magnetic clamping device exerts a magnetic adhesion force weaker than a normal magnetization, and the controller is configured to conduct a test to determine whether the mold peels from the opposing plates by separating the opposing plates after operating the mold handling device, and the controller is further configured such that when detecting peeling, a warning is issued to an operator that the adhesion force cannot be guaranteed, and otherwise, the controller controls the electric current of the magnetizing coil with the ignition circuit so that the magnetic clamping device exerts the magnetic adhesion force by the normal magnetization.

5. The adhesion force confirmation device of claim 4, further comprising:
   a sensor coil for measuring adhesion force of the magnetizing coil, and
   wherein the controller determines whether the mold is a mold for which the test has already been conducted,
      as a result of the determination, in a case of the mold that has not been subjected to the test, the controller is configured to conduct the test and measure and store a magnetic adhesion force with the sensor coil during the test, and
      as a result of the determination, in a case of the mold is a mold for which the test has already been conducted, the controller is configured to conduct the normal magnetization, measuring a magnetic adhesion force with the sensor coil at that time and comparing with the magnetic adhesion force during the test, then in a case that the measured magnetic adhesion force is less than the magnetic adhesion force during the test, issuing a warning to the operator that the adhesion force cannot be guaranteed.

* * * * *